United States Patent
Chen et al.

(10) Patent No.: US 10,365,901 B2
(45) Date of Patent: Jul. 30, 2019

(54) DYNAMIC LEXER OBJECT CONSTRUCTION

(71) Applicant: ENTIT Software LLC, Sunnyvale, CA (US)

(72) Inventors: Qiming Chen, Sunnyvale, CA (US); Meichun Hsu, Sunnyvale, CA (US); Malu G. Castellanos, Sunnyvale, CA (US)

(73) Assignee: ENTIT SOFTWARE LLC, Sanford, NC (US)

( * ) Notice: Subject to any disclaimer, the term of this patent is extended or adjusted under 35 U.S.C. 154(b) by 11 days.

(21) Appl. No.: 15/752,021

(22) PCT Filed: Aug. 14, 2015

(86) PCT No.: PCT/US2015/045327
§ 371 (c)(1),
(2) Date: Feb. 12, 2018

(87) PCT Pub. No.: WO2017/030538
PCT Pub. Date: Feb. 23, 2017

(65) Prior Publication Data
US 2018/0232219 A1 Aug. 16, 2018

(51) Int. Cl.
*G06F 8/41* (2018.01)
*G06F 17/27* (2006.01)
*G06F 9/54* (2006.01)

(52) U.S. Cl.
CPC ............. *G06F 8/425* (2013.01); *G06F 8/427* (2013.01); *G06F 9/54* (2013.01); *G06F 17/2705* (2013.01)

(58) Field of Classification Search
CPC . G06F 8/41; G06F 8/425; G06F 8/427; G06F 17/2705; G06F 9/54
USPC .................................................. 717/136–148
See application file for complete search history.

(56) References Cited

U.S. PATENT DOCUMENTS

| | | | |
|---|---|---|---|
| 5,995,753 A * | 11/1999 | Walker ...................... | G06F 8/24 717/108 |
| 6,272,495 B1 * | 8/2001 | Hetherington ........ | G06F 17/218 |
| 7,031,925 B1 | 4/2006 | Goldberg | |
| 7,093,231 B2 * | 8/2006 | Nuss ......................... | G06F 8/31 707/999.006 |
| 7,197,746 B1 | 3/2007 | Goldberg | |
| 7,263,691 B2 | 8/2007 | Vehkomaki | |
| 7,680,783 B2 | 3/2010 | Ritter et al. | |
| 7,873,992 B1 | 1/2011 | Daily et al. | |

(Continued)

OTHER PUBLICATIONS

Christiansen, "A survey of adaptable grammars", published 1990 in SIGPLAN Notices, 21 pages.

(Continued)

*Primary Examiner* — Marina Lee (57) ABSTRACT

In one example in accordance with the present disclosure, a method for dynamic lexer object construction includes receiving a grammar rule including a variable and a Boolean function to be performed on a character sequence using the variable. The method includes receiving the character sequence and a value corresponding to the character sequence and constructing a lexer object that includes the value as the variable used by the Boolean function. The method includes parsing the character sequence using the lexer object.

20 Claims, 4 Drawing Sheets

(56) References Cited

U.S. PATENT DOCUMENTS

| | | | |
|---|---|---|---|
| 7,962,904 B2* | 6/2011 | Zabokritski | G06F 17/271 |
| | | | 717/143 |
| 8,630,965 B2 | 1/2014 | Savvides et al. | |
| 9,002,876 B2* | 4/2015 | Gatter | G06F 17/30684 |
| | | | 707/769 |
| 9,836,451 B2* | 12/2017 | Halbani | G06F 17/2725 |
| 2008/0097744 A1* | 4/2008 | Levy | G06F 17/2247 |
| | | | 704/4 |
| 2008/0281580 A1* | 11/2008 | Zabokritski | G06F 17/271 |
| | | | 704/9 |
| 2009/0241090 A1 | 9/2009 | Anlauff et al. | |
| 2011/0307740 A1* | 12/2011 | Bruno | G06F 11/3684 |
| | | | 714/32 |
| 2012/0143896 A1* | 6/2012 | Gatter | G06F 17/30684 |
| | | | 707/769 |
| 2013/0159981 A1 | 6/2013 | Klemenz et al. | |
| 2014/0236579 A1 | 8/2014 | Kurz | |
| 2017/0242842 A1* | 8/2017 | Halbani | G06F 17/2725 |
| 2018/0232219 A1* | 8/2018 | Chen | G06F 17/2705 |

OTHER PUBLICATIONS

International Searching Authority, "Notification of Transmittal of the International Search Report and the Written Opinion", PCT/US2015/045327, dated May 17, 2016, 14 pages.

Renggli, L., et al., Practical Dynamic Grammars for Dynamic Languages, May 28, 2010, Retrieved from the Internet:<http://scg.unibe.ch/archive/papers/Reng10cDynamicGrammars.pdf.

\* cited by examiner

DYNAMIC LEXER OBJECT CONSTRUCTION

BACKGROUND

A formal grammar is a set of production rules for interpreting a sequence of characters. Formal grammars may be used in search queries to recognize specific patterns represented by certain tokens and rules. However, tokens often vary among different files and file types. For example, different log files may have different separators for splitting fields, such as ',', '#', '%', etc., or may use different special character sets. The formal grammar may have to be adjusted in order to accommodate various input strings.

BRIEF DESCRIPTION OF THE DRAWINGS

The following detailed description references the drawings, wherein.

DETAILED DESCRIPTION

Formal grammars are typically represented statically in terms of language construct. The static approach, however, presents challenges in adapting the formal grammar for character sequences with different requirements, such as field separators, special character sets, etc. In order to adjust the formal grammar for character sequences with different requirements, traditional formal grammars may have to be redefined and/or recompiled to define specific patterns to be recognized.

Example dynamic lexer object construction systems discussed herein allow characters, tokens and rule sets to be explicitly and dynamically manipulated at run-time for addition, deletion, and modification. Unlike traditional grammar rules that are specified statically in terms of language construct, the example dynamic lexer object construction systems discussed herein specify rule programmatically. By specifying the grammar rules programmatically, the grammar rules can be modified dynamically at run-time using a corresponding Application Programming Interface (API). The dynamic grammar rules may be specified by programming functions such as a match based functions and/or an unmatch based functions. The match based function may be used to specify the inclusion of sub-rules and/or tokens for a rule. The unmatch based function may be used to specify the exclusion of sub-rules and/or tokens for a rule. These functions, plus related APIs, may be specified in the extended lexer. The dynamic lexer object construction approach offers the power of underlying text search query by a formal grammar and the flexibility of adjusting the grammar dynamically in various application contexts. The formal grammar may be used by a parser to analyze input strings, such as character sequences.

A parser has two levels, a lexer level and a visitor level. The first level, or lexer level, includes a lexer defining the syntax of the formal grammar. The syntax includes what characters are allowed, such as what input is valid. After the lexer has been constructed, the grammar is used to construct a parser tree including the data identified by the grammar rule. For example, if the character sequence is a log file and the grammar rule defines a separator, the identified data may be the words separated by the separator. A parser tree is created including the identified data and any necessary actions.

The second level, or visitor level, includes analyzing the parsing tree to retrieve the data and perform any action on the data. The example dynamic lexer object construction systems described herein allow for dynamic adjustment of the grammar rule during run time at the lexer level without re-compiling the grammar.

Example dynamic lexer object construction systems described offer the power of underlying text search query by a formal grammar and the flexibility of accommodating various input texts to fit different contexts dynamically at run-time without re-defining and re-compiling the grammar rule. Using a log-file search as the example, example dynamic lexer object construction systems can be dynamically adjusted to process different log files with different seperators, different special character sets, recognize specific patterns represented by specific tokens and rules, etc.

An example method for dynamic lexer object construction may include receiving a grammar rule including a variable and a Boolean function to be performed on a character sequence using the variable. The method may also include receiving the character sequence and a value corresponding to the character sequence and constructing a lexer object that includes the value as the variable used by the Boolean function. The method may further include parsing the character sequence using the lexer object.

Figure 1:
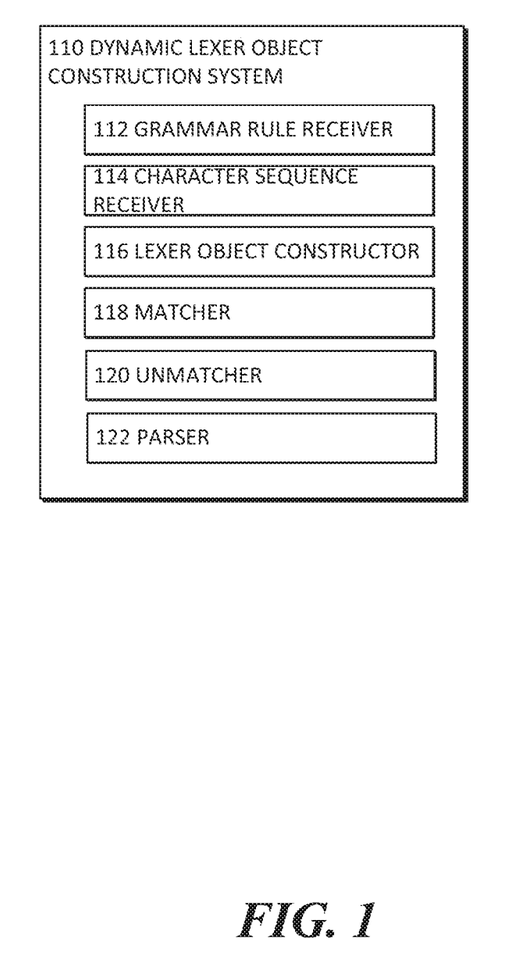
FIG. 1 is a block diagram of an example computing environment in which dynamic lexer object construction may be useful.

FIG. 1 is a block diagram of an example dynamic lexer object construction system 110 for dynamic lexer object construction. In the example shown in FIG. 1 system 110 may comprise various components, including grammar rule receiver 112, character sequence receiver 114, lexer object constructor 116, matcher 118, unmatcher 120, parser 122 and/or other components. According to various implementations, grammar construction system 110 may be implemented in hardware and/or a combination of hardware and programming that configures hardware. Furthermore, in FIG. 1 and other Figures described herein, different numbers of components or entities than depicted may be used. As is illustrated with respect to FIG. 4, the hardware of the various components of grammar construction system 110, for example, may include one or both of a processor and a machine-readable storage medium, while the instructions are code stored on the machine-readable storage medium and executable by the processor to perform the designated function.

Grammar rule receiver 112 may receive a grammar rule. A grammar rule is a production rule with a set of sub-rules and/or tokens which match the rule. The grammar rule may include a variable and a Boolean function to be performed on a character sequence using the variable. The variable may represent a standardized value, such as a default used by an application. The variable may represent a value to be found in the character sequence. The Boolean function may be, for example, a matching function or an unmatching function.

Character sequence receiver 114 may receive a character sequence and a value corresponding to the character sequence. The value may be specified via an Application Programming Interface (API). The value may be a value corresponding to the character sequence, such as a specific value used in the character sequence. For example, if the variable represents a default separator used in a log file, the value may be a particular separator used by the application that generated the character sequence. The value may be, for example, a token, a separator, a character set and/or a wordchar. As will be discussed in further details below, a wordchar is a set of defined characters that will be recognized in a word.

Lexer object constructor 116 may construct a lexer object. The lexer object may include the received value as the variable used by the Boolean function. The lexer object may change the variable from a default value to the received value. For example, the system may include a lexer class that must be constructed before a character sequence can be parsed. The lexer class may include a function and a variable used by the function. The variable can be defined using a default value, but may also be changed at run-time. For example, certain applications, files, character sequences, etc. may have corresponding configuration files that have unique requirements. For example, if an application produces log files that use a ",", as separator, the configuration file can specify the "," value as the separator. The configuration file may use an application programming interface (API) to identify the value in a way that the system can recognize and interpret. Accordingly the lexer object can be constructed at runtime to include the value specified by the configuration file as the variable.

As described above, a grammar rule is a production rule with a set of sub-rules and/or tokens which match the rule. A grammar rule may be defined by a function, such as a Boolean match function. The match function may scan the input character sequence and find a match. To enable dynamic grammar constructon, functions can be introduced to a grammar rule as an extension of the lexer class. For example, a grammar rule may be used to define a separator used for parsing keywords. An example grammar rule may look something like what is shown in Table 1 below.

TABLE 1

```
grammar Fly;
@lexer::members {
  private String separator = ",";
  public FlyLexer(org.antlr.v4.runtime.CharStream input,
          String separator) {
    this(input);
    this.separator = separator;
  }
  boolean matchToken(String text) {
    // check if 'text' is ahead in the CharStream.
    for(int i = 0; i < text.length( ); i++) {
      if(_input.LA(i + 1) != text.charAt(i))
        return false;
    }
    //found, increase the CharStream's index.
    _input.seek(_input.index( ) + text.length( ) - 1);
    return true;
  }
}
r          : keywords ;
keywords   : '{' ID (SEP ID)* '}' ;
SEP        : {matchToken(separator)}? . ;
                // '.' needed since lexer rule must match at least 1 char
ID         : ALPHA (ALPHA | DIGIT)* ;
ALPHA      : [a-zA-Z] ;
DIGIT      : [0-9] ;
WS         : [ \t\r\n]+ -> skip ;   // skip spaces, tabs, newlines
```

In the example grammar rule of table 1, the separator (SEP) is specified programmatically using the matchtoken function. The matchtoken function scans the input text characters for a match. The default separator (SEP) may be for example, ',', however, the default separator can be replaced at run-time via the lexer's constructor.

An example output of the grammar rule using the default separator may look something like what is shown in Table 2 below.

TABLE 2

```
# input: ("{Laserjet2552, Deskjet1600}")
parse tree: (r (keywords { Laserjet2552 , Deskjet1600 }))
```

As shown in Table 2, two keywords "Laserjet2552" and "Deskjet1600" are parsed from the input character sequence. Although Table 2 illustrates a simplified example with only two keywords, the systems discussed herein may be used with more complicated input character sequences.

Moreover, while the example depicted in Table 1 uses the default separator, some input character sequences may use a different separator. For example, certain applications may produce log files using a variety of separators, such as as ',', '#', '%', etc. At run-time, the default separator can be dynamically replaced by, for example, a user. An example output of the grammar rule using a substitute separator ";" may look something like what is shown in Table 3 below.

TABLE 3

```
# input; ("{Omnibook4607b; Omnibook8848a}", ";")
parse tree: (r (keywords { Omnibook4607b ; Omnibook8848a }))
```

As shown in Table 3, two keywords "Omnibook4607b" and "Omnibook8848a" are parsed from the input character sequence using the substitute separator.

As another example, a grammar rule may be used to dynamically adjust a character set. A character set is a defined set of recognized characters. An example grammar rule defining a character set may look something like what is shown in Table 4 below.

TABLE 4

```
grammar Flyset;
@lexer::members {
  private java.util.Set<String> charset = new
java.util.HashSet<String>(java.util.Arrays.asList(
        new String[ ] { "a", "b", "c", "d" }));
  public FlysetLexer(org.antlr.v4.runtime.CharStream input,
          java.util.Set<String> charset) {
    this(input);
    this.charset = charset;
  }
  boolean match_any_valid_token(java.util.Set<String> tokens) {
      for (String token: tokens) {
        if (matchToken(token) == true)
          return true;
      }
      return false;
  }
  boolean matchToken(String text) {
    // check if 'text' is ahead in the CharStream.
    for(int i = 0; i < text.length( ); i++) {
      if(_input.LA(i + 1) != text.charAt(i))
        return false:
    }
    //found, increase the CharStream's index.
    _input.seek(_input.index( ) + text.length( ) - 1);
    return true;
  }
}
r             : keywords ;
keywords      : '{' ID (SEP ID)* '}' ;
SEP           : [,] ;
```

TABLE 4-continued

| | |
|---|---|
| ID | : ALPHA (ALPHA \| DIGIT)* ; |
| ALPHA | : {match_any_valid_token(charset)}? . ; |
| DIGIT | : [0-9] ; |
| WS | : [ \t\r\n]+ -> skip ; |

In the example depicted in Table 4, the grammar rule includes a default character set of lower case letters (for simplicity not all letters were included in the example). The default character set represents the characters that will be recognized by the grammar rule. At run-time, however, the default character set may be replaced. An example output of the grammar rule using a substitute character set may look something like what is shown in Table 5 below.

TABLE 5 input: ("{AB1, CD3}", alternative_charset) [D, A, B, C]
parse tree: (r (keywords { AB1 , CD3 }))

The example in Table 5 illustrates the adaptive feature of the grammar rule. In the parsing call, the default character set (lower case letters) is replaced with the substitute character set (upper case letters). The substitute character set may be passed in as argument to the parsing call.

As yet another example, a grammar rule can be used to dynamically adjust a "token." A token is a defined string of characters. An example grammar rule defining a default value of tokens as "apple" and "orange" may look something like what is shown in Table 6 below.

TABLE 6

```
grammar Flytokens;
@lexer::members {
    private java.util.Set<String> toks =
        new java.util.HashSet<String>(java.util.Arrays.asList(
        new String[ ] { "apple", "orange" }));
    public FlytokensLexer(org.antlr.v4.runtime.CharStream input,
        java.util.Set<String> new_toks) {
        this(input);
        for (String tok: new_toks) this.toks.add(tok);
    }
    boolean match_any_valid_token(java.util.Set<String> tokens) {
        for (String token: tokens) {
            if (matchToken(token) == true)
                return true;
        }
        return false;
    }
    boolean matchToken(String text) {
        // check if 'text' is ahead in the CharStream.
        for(int i = 0; i < text.length( ); i++) {
            if(_input.LA(i + 1) != text.charAt(i))
                return false;
        }
        //found, increase the CharStream's index.
        _input.seek(_input.index( ) + text.length( ) - 1);
        return true;
    }
}
r         : keywords ;
keywords  : '{' ID (SEP ID)* '}' ;
SEP       : [,] ;
ID        : (match_any_valid_token(toks))? . ;
WS        : [ \t\r\n]+ -> skip ;
```

An example depicting how tokens can be substituted may look something like what is shown in Table 7 below.

TABLE 7 input: ("{apple, orange, strawberry, raspberry, blueberry}", new_tokens)
[rastberry, blueberry, strawberry]
parse tree: (r (keywords { apple , orange , strawberry , raspberry , blueberry }))

In one example, a grammar rule may represent the negation of the given sub-rules and/or tokens. For example, a wordchar (a character allowed in a word) can be any character except [,;\n\r\t]. In this example, "/n" may represent a new line, "/r" may represent a return and "/t" may represent a tab. This wordchar definition may be specified in a grammar rule as wordchar: ~[,;\n\r\t]. Moreover, the characters allowed/disallowed in a word can be adjusted dynamically. For example, certain characters that are typically not used in words may be included in a Uniform Resource Locator (URL). Accordingly, the grammar rule can be dynamically constructed at run time to include certain characters, such as: ":", "/" and ".".

An example of a grammar rule representing the negation of the given sub-rules and/or tokens may look something like what is shown in Table 8 below.

TABLE 8

```
grammar Search;
@lexer::members {
    //no space in between
    private String majorsep_ssv = "[ ]<>( ){ }|!;*\"&?+ \n\t\t";
    private java.util.Set<String> majorsep =
        new java.util.HashSet<String>
        (ssv_to_list(majorsep_ssv));
    public SearchLexer(org.antlr.v4.runtime.CharStream input,
        String majorsep_ssv) {
        this(input);
        this.majorsep = new java.util.HashSet<String>
            (java.util.Arrays.asList(
            majorsep_ssv.split("\\s+")
        ));
    }
    boolean match_any_preset_token(java.util.Set<String> tokens) {
        for (String token: tokens) {
            if (matchToken(token) == true)
                return true;
        }
        return false;
    }
    boolean unmatch_any_preset_token(java.util.Set<String> tokens) {
        for (String token: tokens) {
            if (matchToken(token) == true)
                return false;
        }
        return true;
    }
    boolean matchToken(String text) {
        // check if 'text' is ahead in the CharStream.
        for(int i = 0; i < text.length( ); i++) {
            if(_input.LA(i + 1) != text.charAt(i))
                return false;
        }
        //found, increase the CharStream's index.
        _input.seek(_input.index( ) + text.length( ) - 1);
        return true;
    }
    ......
}
......
WORDCHAR: {unmatch_any_preset_token(majorsep)}? . ;
```

The grammar header of the example grammar rule in Table 8 defines match as well as un-match functions. In the grammar rule, wordchar is defined by an unmatch function specifying that any character not included in the major separators (majorsep) is a word character. The default set of characters in the major separators is initially given but can be added, dropped or replaced at the run-time using the constructor of the lexer.

Matcher 118 may match the received value to at least one token in the character sequence. Unmatcher 120 may match a value to at least one token not included in the character sequence.

Parser 122 may parse the character sequence using the lexer object.

Figure 2:
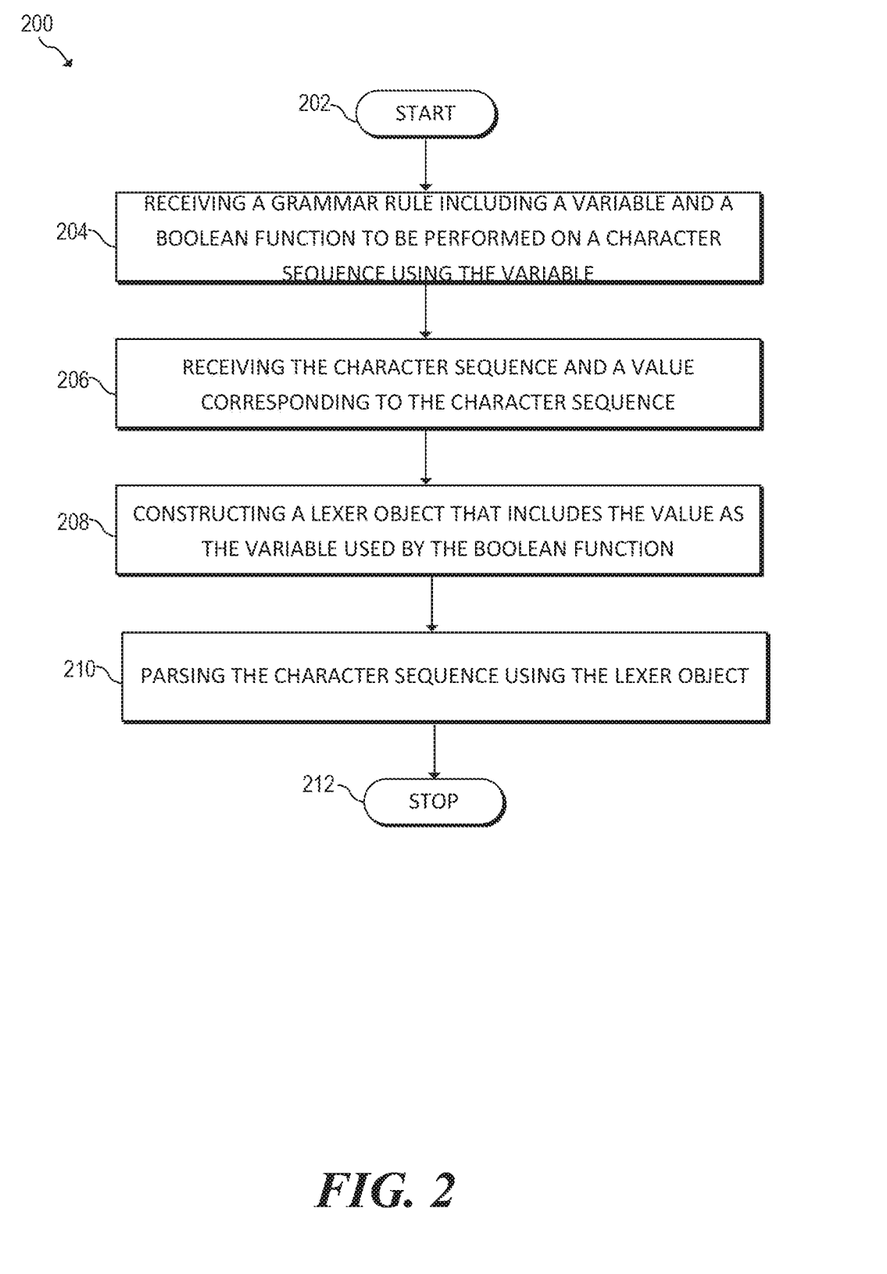
FIG. 2 is a flowchart of an example method for dynamic lexer object construction.

FIG. 2 is a flowchart of an example method 200 for dynamic lexer object construction. Method 200 may be described below as being executed or performed by a system, for example, system 110 of FIG. 1, system 300 of FIG. 3 or system 400 of FIG. 4. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). The steps of method 200 may be executed substantially concurrently or in a different order than shown in FIG. 2. Method 200 may include more or less steps than are shown in FIG. 2. The steps of method 200 may, at certain times, be ongoing and/or may repeat.

Method 200 may start at step 202 and continue to step 204, where the method may include receiving a grammar rule. The grammar rule may include a variable and a Boolean function to be performed on a character sequence using the variable. The Boolean function may be, for example, a matching function or an unmatching function. The function may be added to the grammar rule as an extension of the lexer class. The variable may represent a standardized or default value. The variable may represent a value to be found in a character sequence, such as a field separator. At step 206, the method 200 may include receiving the character sequence and a value corresponding to the character sequence. The value may be used by an application that produced the character sequence. For example, a certain application may use a ",", as a field separator and the ",", may be received as a value. The value may be specified using an Application Programming Interface (API) and may be included in, for example, a configuration file. The value may be, for example, a token, a filed separator, a character set, a wordchar, etc.

At step 208, the method 200 may include constructing a lexer object that includes the value as the variable used by the Boolean function. Each use of the variable may be replaced by the value when constructing the lexer object. In one example, the value may replace a default value used in the grammar rule. The lexer object may be constructed at run time, in the lexer level of parsing. The lexer object may be constructed without having to recompile the grammar rule. At step 210, the method 200 may include parsing the character sequence using the lexer object. Method 200 may eventually continue to step 212, where method 200 may stop.

Figure 3:
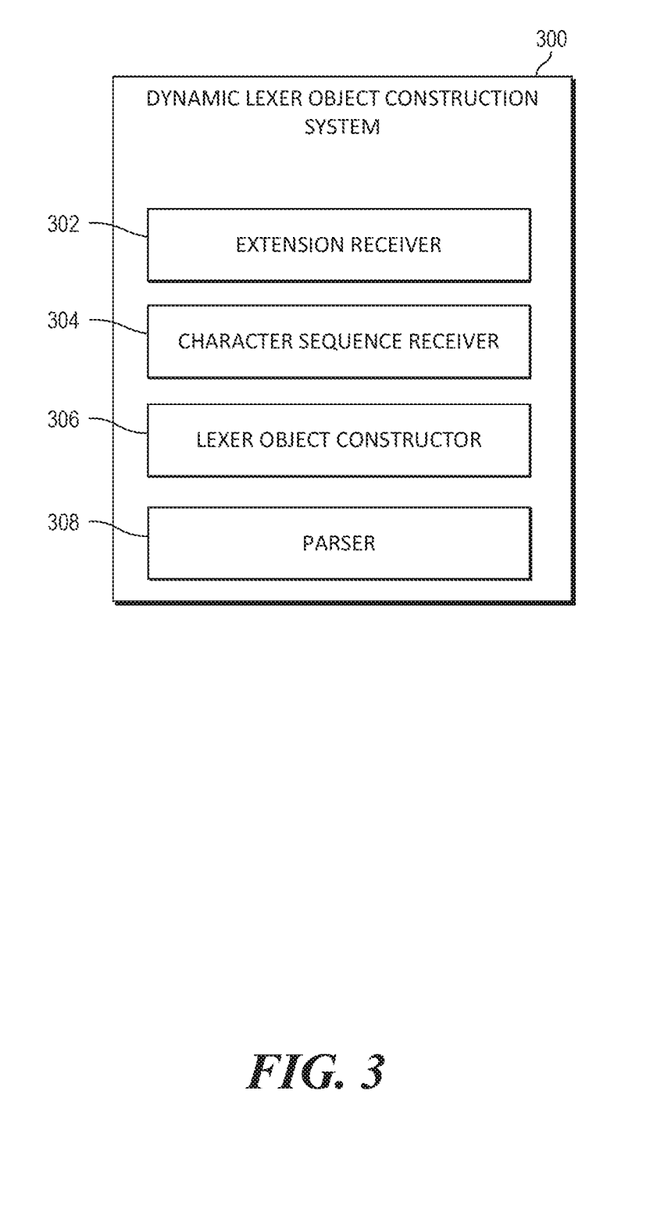
FIG. 3 is a block diagram of an example system for dynamic lexer object construction.

FIG. 3 is a block diagram of an example operating frequency determination system 300. System 300 may be similar to system 110 of FIG. 1, for example. In the example shown in FIG. 3, system 300 includes extension receiver 302, character sequence receiver 304, lexer object constructor 306 and parser 308.

Extension receiver 302 may receive an extension of a lexer class defining a Boolean function and a variable used by the Boolean function. The variable may represents a value to be found in a character sequence. The Boolean function may be, for example, a matching function or an unmatching function. The variable may represent a standardized or default value. The variable may represent a value to be found in a character sequence, such as a field separator.

Extension receiver 302 may be implemented in the form of executable instructions stored on at least one machine-readable storage medium of system 300 and executed by at least one processor of system 300. Alternatively or in addition, extension receiver 302 may be implemented in the form of a hardware device including electronic circuitry or in a firmware executed by a processor for implementing the functionality of extension receiver 302.

Character sequence receiver 304 may receive the character sequence and a value corresponding to the character sequence. The value may be used by an application that produced the character sequence. For example, a certain application may use a ",", as a field separator and the ",", may be received as a value. The value may be specified using an Application Programming interface (API) and may be included in, for example, a configuration file. The value may be, for example, a token, a filed separator, a character set, a wordchar, etc.

Character sequence receiver 304 may be implemented in the form of executable instructions stored on at least one machine-readable storage medium of system 300 and executed by at least one processor of system 300. Alternatively or in addition, character sequence receiver 304 may be implemented in the form of a hardware device including electronic circuitry or in firmware executed by a processor for implementing the functionality of character sequence receiver 304.

Lexer object constructor 306 may construct a lexer object that defines the variable as the value. Each use of the variable may be replaced by the value when constructing the lexer object. In one example, the value may replace a default value used in the grammar rule. The lexer object may be constructed at run time, in the lexer level of parsing. The lexer object may be constructed without having to recompile the grammar rule. Lexer object constructor 306 may be implemented in the form of executable instructions stored on at least one machine-readable storage medium of system 300 and executed by at least one processor of system 300. Alternatively or in addition, lexer object constructor 306 may be implemented in the form of a hardware device including electronic circuitry for implementing the functionality of lexer object constructor 306.

Parser 308 may parse the character sequence using the lexer object. Parser 308 may be implemented in the form of executable instructions stored on at least one machine-readable storage medium of system 300 and executed by at least one processor of system 300. Alternatively or in addition, parser 308 may be implemented in the form of a hardware device including electronic circuitry or in firmware executed by a processor for implementing the functionality of parser 308.

Figure 4:
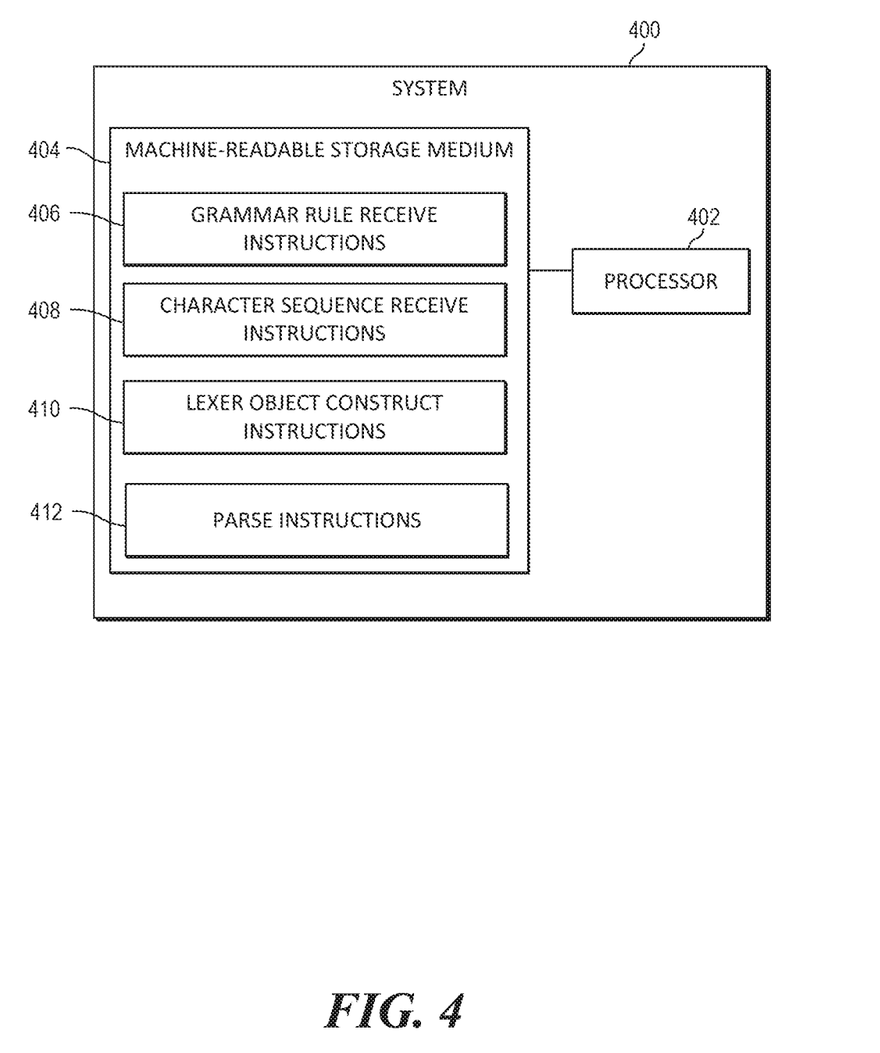
FIG. 4 is a block diagram of an example system for dynamic lexer object construction.

FIG. 4 is a block diagram of an example system 400 for dynamic lexer object construction. In the example shown in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be one or more central processing units (CPUs), microprocessors, and/or other hardware devices suitable for retrieval and execution of instructions stored in machine-readable storage medium 404. In the example shown in FIG. 4, processor 402 may fetch, decode, and execute instructions 406, 408, 410 and 412 to perform dynamic lexer object construction. As an alternative or in addition to retrieving and executing instructions, processor 402 may include one or more electronic circuits comprising a number of electronic components for performing the functionality of one or more of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Alternatively, machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for dynamic lexer object construction.

Referring to FIG. 4, grammar rule receive instructions 406, when executed by a processor (e.g., 402), may cause system 400 to receive a grammar rule including a variable and a Boolean function to be performed on a character sequence. The variable may represent a default value used by the Boolean function. The Boolean function may be, for example, a matching function or an unmatching function. The function may be added to the grammar rule as an extension of the lexer class. The variable may represent a standardized value. The variable may represent a value to be found in a character sequence, such as a field separator.

Character sequence receive instructions 408, when executed by a processor (e.g., 402), may cause system 400 to receive the character sequence and a received value used by an application that output the character sequence. For example, a certain application may use a "," as a field separator and the "," may be received as a value. The value may be specified using an Application Programming Interface (API) and may be included in, for example, a configuration file. The value may be, for example, a token, a filed separator, a character set, a wordchar, etc.

Lexer object construct instructions 410, when executed by a processor (e.g., 402), may cause system 400 to construct a lexer object that changes the variable from the default value to the received value. Each use of the variable may be replaced by the value when constructing the lexer object. In one example, the value may replace a default value used in the grammar rule. The lexer object may be constructed at run time, in the lexer level of parsing. The lexer object may be constructed without having to recompile the grammar rule.

Parse instructions 412, when executed by a processor (e.g., 402), may cause system 400 to parse the character sequence using the lexer object.

The foregoing disclosure describes a number of examples for dynamic lexer object construction. The disclosed examples may include systems, devices, computer-readable storage media, and methods for dynamic lexer object construction. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method, comprising:
   receiving, as an input, a value for a variable of a grammar rule, the grammar rule defining a structure of a character sequence to be parsed and including a default value for the variable;
   replacing the default value in the grammar rule with the received value;
   receiving the character sequence;
   executing a lexer object that includes a Boolean function that evaluates the character sequence based on the grammar rule; and
   parsing the character sequence using the lexer object.

2. The method of claim 1, wherein the Boolean function includes a matching function and parsing the character sequence further comprises matching the value to a token in the character sequence.

3. The method of claim 1, wherein the Boolean function is an unmatching function and parsing the character sequence further comprises identifying a token in the character sequence that does not match the variable and determining that the identified token includes a word character.

4. The method of claim 1, wherein the variable is specified via an application programming interface.

5. The method of claim 1, wherein the variable represents a standardized value.

6. The method of claim 1, wherein the function is added to the grammar rule as an extension of a lexer class.

7. A system comprising:
   a processor to:
      receive an extension of a lexer class defining a Boolean function and a variable used by the Boolean function, wherein the variable represents a value to be found in a character sequence;
      replace a default value in a grammar rule with the variable;
      receiver to receive the character sequence;
      execute a lexer object that includes the Boolean function, wherein the Boolean function evaluates the character sequence based on the grammar rule; and
      parse the character sequence using the lexer object.

8. The system of claim 7, wherein the value is one of: a token, a separator, a character set or a wordchar.

9. The system of claim 7, wherein the Boolean function includes a matching function and the parser further matches the value to a token in the character sequence.

10. The system of claim 7, wherein the Boolean function is an unmatching function and the parser further identifies a token in the character sequence that does not match the variable and determines that the identified token includes a word character.

11. The system of claim 7, wherein the lexer object is to further:
construct the lexer object at run time without re-compiling a grammar rule.

12. A non-transitory machine-readable storage medium comprising instructions that when executed by a processor are to cause the processor to:
receive a grammar rule including a value and a Boolean function to be performed on a character sequence, wherein the Boolean function uses a default value for parsing the character sequence;
receive the character sequence;
construct a lexer object based on the received value; and
parse the character sequence using the lexer object.

13. The non-transitory machine-readable storage medium of claim 12, wherein the received value represents data to be found in a character sequence.

14. The non-transitory machine-readable storage medium of claim 12, wherein the received value is specified via an application programming interface.

15. The non-transitory machine-readable storage medium of claim 12, further comprising instructions that are to cause the processor to:
construct the lexer object in a lexer level.

16. The method of claim 1, wherein the Boolean function includes a matching function, and wherein parsing the character sequence comprises matching a token of the character sequence with the received value.

17. The method of claim 16, wherein the value comprises a separator, the method further comprising:
generating a parsed array comprising a plurality of tokens that were separated by the separator in the character sequence.

18. The method of claim 16, wherein the value comprises a replacement character set, the method further comprising:
replacing a first character set of tokens in the character sequence based on the replacement character set.

19. The method of claim 16, wherein the value comprises a replacement word, the method further comprising:
replacing a first word in the character sequence based on the replacement word.

20. The method of claim 1, wherein receiving the value comprises:
retrieving, at runtime, the value from a configuration file that encodes the value.

\* \* \* \* \*